Figure 1:
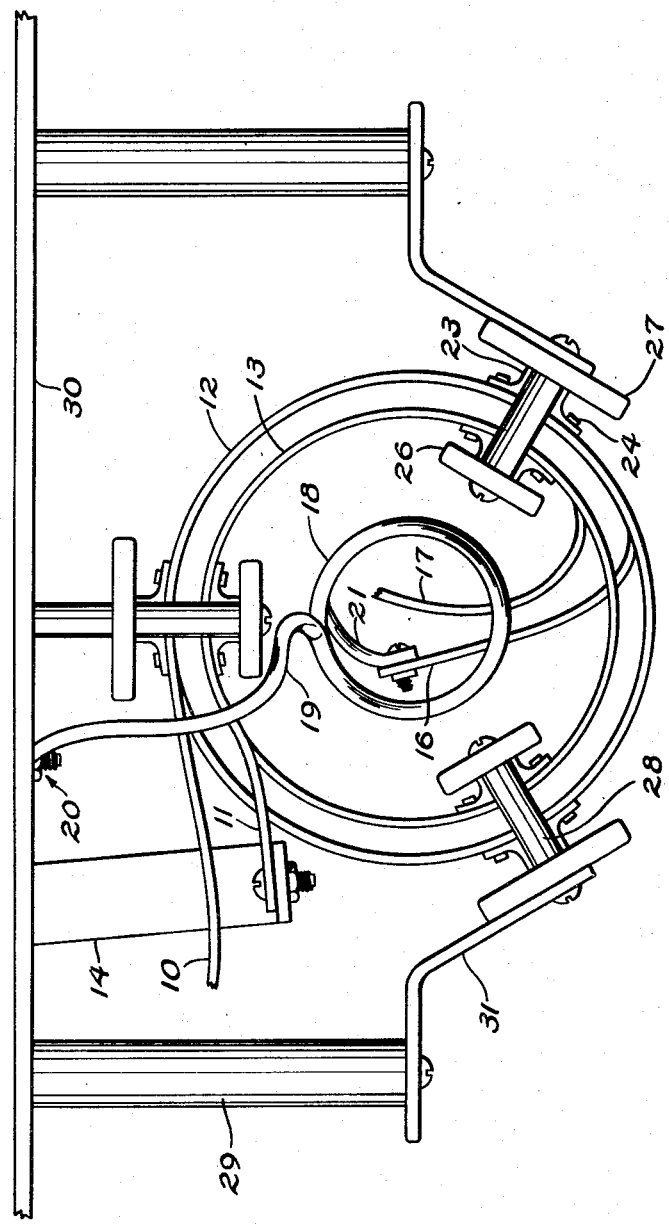

April 26, 1960

V. R. DE LONG 2,934,721

UNBALANCED TO BALANCED NETWORK MEANS

Filed Nov. 5, 1956

2 Sheets-Sheet 1

INVENTOR.
VINCENT R. DELONG
BY
ATTORNEYS

April 26, 1960 V. R. DE LONG 2,934,721
UNBALANCED TO BALANCED NETWORK MEANS
Filed Nov. 5, 1956 2 Sheets-Sheet 2

INVENTOR.
VINCENT R. DELONG
BY
Moody & Habecker
ATTORNEYS

United States Patent Office 2,934,721
Patented Apr. 26, 1960

2,934,721

UNBALANCED TO BALANCED NETWORK MEANS

Vincent R. De Long, Cedar Rapids, Iowa, assignor to Collins Radio Company, Cedar Rapids, Iowa, a corporation of Iowa Application November 5, 1956, Serial No. 620,241

1 Claim. (Cl. 333—26)

This invention relates to power network systems and more particularly to networks for supplying a balanced load from an unbalanced power source.

Prior art attempts in this field, to supply a load balanced with respect to ground from a power source having one side grounded, have been satisfactory only at a fixed frequency under carefully engineered conditions. The usual method has been to feed the center-tapped grounded load from the generator through series inductances. Necessarily, when the frequency changes, the balance achieved at the load terminals varies.

Part of the unbalance arising has been due to the shunting affect of the choke connect to the grounded terminal of the generator. This choke, while used to feed one terminal of the load, is also directly in shunt to ground. The characteristics of this choke then play an inordinately large role in the balance of the load voltages. Further, phase shifts and minor resonances in both chokes unbalance the load voltages as a consequence of the unequal currents passing therethrough.

Attempts to use a balancing network of this type over the extended frequency range of two to thirty megacycles have been frusted by the size requirements for chokes having a high inductance, to lessen low frequency shunting, while achieving chokes having a satisfactorily high frequency range without resonances.

While the problem is obviously difficult for low levels of power, the problem becomes immensely greater when a power level of up to ten kilowatts is contemplated such as for use in transmitting equipment.

Accordingly, it is an object of this invention to provide a network yielding a truly balanced output voltage, with respect to ground, even in the absence of a load ground connection, from an unbalanced power source.

It is a further object of this invention to provide a network for insertion between an unbalanced power source and a balanced load of the same impedance capable of providing balanced output voltages over a wide frequency range.

It is a further object of this invention to provide a network capable of operation in high power levels without difficulties due to arc-over.

It is a feature of this device that a bifilar coil arrangement capable of high voltage gradients is utilized in a compact coiled assembly to provide some of the necessary inductances.

It is a further feature of this device that the three inductances of the invention are constructed concentrically and are so arranged that mutual inductances arising thereby are utilized to enhance the operation of the balancing system.

Figure 2:
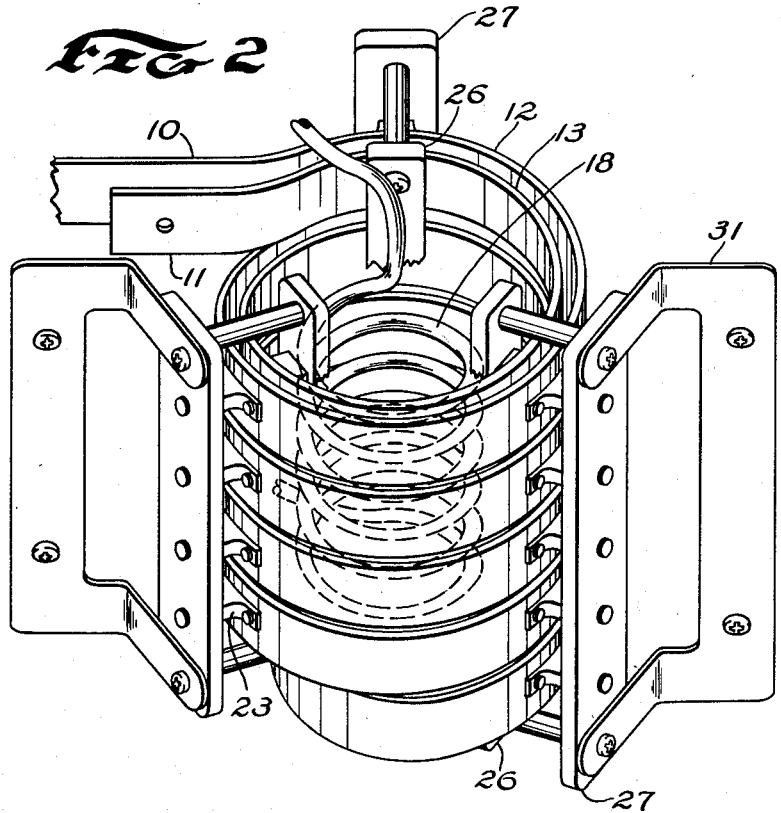
Figure 3:
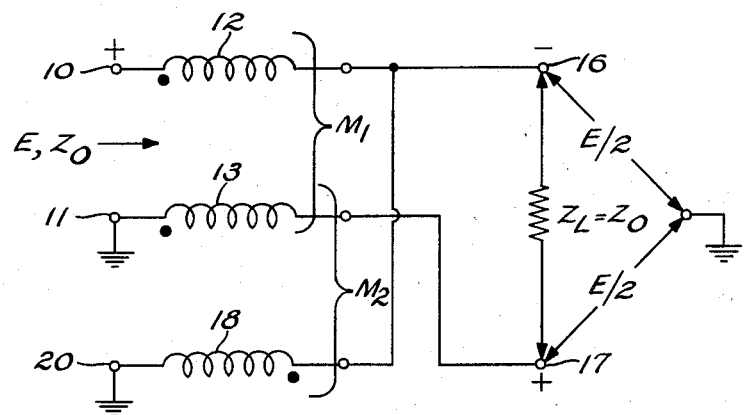

Further objects, features, and advantages of the invention will become apparent from the following description and claim when read in view of the drawings in which:

Figure 1 shows an end view of the coil assembly showing the construction thereof, Figure 2 shows an isometric view of the coil assembly, and Figure 3 shows the electrical circuit diagram thereof.

In Figure 1 a pair of flat rectangular conductors 10 and 11 are wound as a bifilar coil into two concentric helical coils with the flat sides opposite, and which are visible in the end view as 12 and 13, respectively. The straight ends of the bifilar ribbons, at 10 and 11, are connected to the power source and the group strap 14, respectively. The other ends 16 and 17, respectively, of the conductors 10 and 11, at the opposite end of the coils, are connected to the load. A third coil 18, concentric to and completely within the innermost flat conductor helix, is formed of self-supporting wire. The near end 19 of coil 18 is grounded at 20 and the far end 21 is connected to end 16 of one of the bifilar windings.

In view of the high potentials involved, extreme care has to be exercised in mounting the coils to provide high voltage gradient capabilities. Accordingly, the flat rectangular section conductors are mounted by means of small T's 23. These T's fasten to the conductors by countersunk rivets 24 which leave a completely flat surface in the space between the conductors with no potential stress raising points. The T's are mounted on insulating bars 26 and 27. These bars are of rigid insulating material, such as for example, a ceramic. The bars are mounted between insulating studs 28 which hold the bars and consequently the coils in spaced relation. The T's are fastened to the bars 26 and 27 by means not visible in this view.

The bifilar windings are held by three mounting bar sets at equally spaced points around the perimeters of the cylinders. The bars are mounted by studs or posts 29 from a base 30 with the additional help of angle brackets 31.

The inner concentric coil 18, as stated before, is self-supporting. This is so by virtue of the stiffness of the coil which is shown of a round conductor to help distinguish this coil from the other coils. The ends 19 and 21 are mounted on the base 30 at ground point 20 and at the load end of helix 12, both points of which are rigid.

Figure 2 shows an isometric view of the coil assembly of Figure 1 showing more clearly the relation of the three coils 12, 13, and 18, 12 and 13 being mounted by the brackets 31 and the mounting bars 26 and 27. Another view is also available in this figure of the mounting T's 23, showing their relation between the coils and the insulating mounting bars 26 and 27.

Figure 3 shows the circuit diagram embodied in Figures 1 and 2. Inductances 12 and 13 feeding the load terminals 16 and 17 from the power source terminals 10 and 11 have a mutual inductance $M_1$, and polarities as indicated by the dots. The polarity dot indicates the positive voltage end of the mutually-linked secondary coil when a positive current enters the dot-marked end of the primary coil. Third coaxial winding 18 is connected between ground point 20 and load terminal 16. In the ultimate preferred form of the invention coil 18 also has a mutual inductance coupling $M_2$ to the bifilar coils 12 and 13, mostly to coil 13. The polarity of mutual coupling $M_2$ is shown by the dot. A load having an impedance $Z_0$ is shown; no ground is needed, however, to provide proper operation of the circuit.

In prior art circuits the balanced load at terminals 16 and 17 was originally fed from power source terminals 10 and 11 by means of two chokes or inductances in the place of coils 12 and 13. These prior art inductances had no mutual coupling and served merely as isolating impedances. As has been discussed before, it is readily seen that the inductance in the place of coil 13 shunts load terminal 17 to ground whereas load terminal 16 has no shunting impedance of this nature.

In the present device a third inductance 18 has inductance equal to that of coil 13. Coil 18 is connected to load terminal 16 providing a balanced-to-ground impedance characteristic of the network.

This connection, however, is not a complete solution to the problem. The inherent characteristics of inductances provide an undesirable limit to the operation of the circuit. The inductance values of coils 13 and 18 are required to be greater than the characteristic impedance of the load at low frequencies. Once this inductance value is established, the same inductor is required to maintain its impedance value at higher frequencies and without becoming resonant or ineffective in some manner such as to be an impedance value below the characteristic impedance of the circuit. Combined with the high power requirements of the circuit, the inductance requirements thus become very difficult.

The addition of coil 18 ameliorated the basic circuit problem, and the concentric construction of coils 12, 13, and 18, providing necessary mutual inductances as explained below between the various coils, complete the solution to the problem. By use of mutual inductance augmenting inherent inductances, the inductance value of the coil for its size is optimized so as to provide a smaller coil capable of higher frequency excursion from a predetermined low frequency.

In operation, the circuit of Figure 3 acts in the following manner: Bifilar windings 12 and 13 are considered a transmission line between terminals 10 and 11, and 16 and 17. The transmission line is terminated by load impedance $Z_L$ equal to the characteristic impedance of the line $Z_0$. The input impedance of the unbalanced side is substantially that of $Z_0$. It can be seen readily that the load currents are equal in the two inductances and that there is very little external magnetic field either inside or outside of the helices taken as the transmission line. There is, however, an unbalance current entering terminal 17 by virtue of the connection of this terminal to ground by the inductance winding 13. This current sets up a magnetic field within the helix of coil 13. This unbalance current in coil 13 induces a current in coil 18 by the coupling $M_2$; this current enters terminal 16 along with the load current from the power source as delivered thereto by coil 12. The polarity of the current in coil 18, being determined by the coil's physical arrangement, is such as to be the same as the polarity of the unbalance current flowing in coil 13 which enters terminal 17. Thus the total currents which enter terminals 16 and 17 are equal and of the opposite polarity, creating equal voltages at these nodes with respect to ground.

A further benefit is achieved by inserting winding 18 within the magnetic field of the bifilar windings 12 and 13. By inserting winding 18 within the magnetic field of the other windings, a mutual coupling term is added to the expression for the inductance of coil 18, increasing the actual inductance of winding 18. The inductance in the circuit thus is greater for the low frequency end of the range of operation, yet the physical size of the inductance is smaller than can be achieved by a separate coil, permitting more satisfactory operation of the high frequency end of the range of operation. In determining the direction of current flow, and in view of the circuit connection external to the coil, coil 18 is wound in the opposite direction to that of helices 12 and 13 in order to simplify its connections to the load terminal 16.

It is to be noted that the load voltages are now balanced with respect to ground without the use of a ground point in the load itself. The addition of coil 18 with its mutual inductance forces the balance to be exact; the use of the mutual couplings among the coils permits smaller coils for a required shunting inductance, relative to the impedance of the circuit for the low frequency range, while permitting a higher frequency range as a consequence of the smaller coils. Exemplary of the success of the circuit is the fact that a frequency range of two to thirty megacycles at power levels of ten kilowatts are readily possible with inductances approximately the size of Figure 1 in impedance levels of approximately fifty ohms.

Although this invention has been described with respect to particular embodiments thereof, it is not to be so limited because changes and modifications may be made therein which are within the full intended scope of the invention as defined by the appended claim.

I claim:

A balanced-to-unbalanced coupling network operable over a wide frequency range comprising in combination an outer, an intermediate and an inner coaxial helical conductor, first and second pairs of terminals for connecting an unbalanced circuit and a balanced circuit respectively to said network, said outer conductor and said intermediate conductor each being connected between a respective terminal of said first pair of terminals and a respective terminal of said second pair of terminals, said outer and said intermediate conductors having turns spaced apart as required for forming a transmission line of certain characteristic impedance, that one of said first pair of terminals which is connected to the intermediate conductor also being connected to ground, the ends of said outer and intermediate conductors with the same polarity being connected to the same pair of terminals, said balanced circuit having impedance equal to said certain characteristic impedance of said transmission line, one end of said inner conductor being connected to that end of said outer conductor that is connected to said second pair of terminals, the remaining end of said inner conductor being connected to ground, the polarity of said one end of said inner conductor having a polarity corresponding to that of said ends that are connected to said first pair of terminals, said inner conductor having inductance equal to the inductance of said intermediate conductor and being closely coupled thereto for balancing out current to ground in said intermediate conductor that tends toward unbalance of said balanced circuit, and the coupling between said inner and said intermediate conductors functioning to increase the impedance between said balanced circuit and ground.

References Cited in the file of this patent

UNITED STATES PATENTS

| | | |
|---|---|---|
| 2,222,169 | Buschbeck et al. | Nov. 19, 1940 |
| 2,709,219 | Schmidt | May 24, 1955 |
| 2,727,149 | Sands | Dec. 13, 1955 |